(12) United States Patent
Shearer, III et al.

(10) Patent No.: US 7,447,261 B2
(45) Date of Patent: Nov. 4, 2008

(54) ADAPTIVE FREQUENCY EQUALIZER

(75) Inventors: Daniel D. Shearer, III, Scottsdale, AZ (US); Alex C. Yeh, West Melbourne, FL (US); Mark A. Webster, Indian Harbour, FL (US); Steven D. Halford, Palm Bay, FL (US)

(73) Assignee: Conexant Systems, Inc., Red Bank, NJ (US)

( * ) Notice: Subject to any disclaimer, the term of this patent is extended or adjusted under 35 U.S.C. 154(b) by 637 days.

(21) Appl. No.: 10/886,025

(22) Filed: Jul. 8, 2004

(65) Prior Publication Data

US 2005/0053128 A1     Mar. 10, 2005

Related U.S. Application Data

(60) Provisional application No. 60/485,159, filed on Jul. 8, 2003.

(51) Int. Cl.
*H03K 5/159* (2006.01)
(52) U.S. Cl. .................................... 375/232
(58) Field of Classification Search ......... 375/229–233, 375/262, 341, 350
See application file for complete search history.

(56) References Cited

U.S. PATENT DOCUMENTS

| | | | |
|---|---|---|---|
| 5,111,481 A * | 5/1992 | Chen et al. ................ | 375/232 |
| 5,392,315 A * | 2/1995 | Laud ........................ | 375/232 |
| 6,011,814 A | 1/2000 | Martinez et al. | |
| 6,034,993 A * | 3/2000 | Norrell et al. ............ | 375/232 |
| 6,038,251 A | 3/2000 | Chen | |
| 6,055,268 A | 4/2000 | Timm et al. | |
| 6,535,552 B1 | 3/2003 | Pessoa | |
| 6,542,540 B1 | 4/2003 | Leung et al. | |
| 6,810,076 B1 * | 10/2004 | Tang et al. ................ | 375/219 |
| 6,947,480 B2 * | 9/2005 | Beale et al. .............. | 375/229 |
| 7,006,565 B1 * | 2/2006 | Endres et al. ............ | 375/233 |
| 7,027,500 B1 * | 4/2006 | Casas et al. .............. | 375/232 |
| 7,054,396 B2 * | 5/2006 | Shan ........................ | 375/346 |
| 2001/0040921 A1 | 11/2001 | Guinea et al. | |
| 2004/0001541 A1 | 1/2004 | Haghighat | |
| 2004/0022327 A1 | 2/2004 | Samueli et al. | |
| 2004/0022328 A1 | 2/2004 | Laamanen | |
| 2004/0125871 A1 | 7/2004 | Kim | |
| 2004/0165674 A1 | 8/2004 | Huang | |
| 2004/0190661 A1 | 9/2004 | Vrazel | |
| 2005/0047500 A1 | 3/2005 | Gupta et al. | |
| 2005/0152460 A1 | 7/2005 | Yoshimi et al. | |

* cited by examiner

*Primary Examiner*—Khanh C Tran
(74) *Attorney, Agent, or Firm*—Thomas, Kayden, Horstemeyer & Risley LLP

(57) ABSTRACT

An adaptive frequency equalization system providing an equalizer that has programmable taps that adjusts magnitude and phase of symbol information of a received signal and that provides equalized symbol information. The system includes a hard decision circuit that selects ideal symbol values using the equalized symbol information. A frequency response circuit determines frequency response update values using the ideal symbol values and the received signal. An adjust circuit updates stored frequency response information using the frequency response update values, and also updates the programmable taps of the equalizer using the stored frequency response information.

20 Claims, 4 Drawing Sheets

ADAPTIVE FREQUENCY EQUALIZER

CROSS-REFERENCE TO RELATED APPLICATIONS

This application claims priority to Provisional Application No. 60/485,159 filed on Jul. 8, 2003 and entitled "Adaptive Frequency Equalizer."

FIELD OF THE INVENTION

The present invention relates to wireless communications, and more particularly to an adaptive frequency equalizer for wireless communications to improve channel estimate determination.

DESCRIPTION OF RELATED ART

The typical environment in which Wireless Local Area Networks (WLANs) and the like are deployed are very noisy and not optimal for wireless communications. For example, most homes and work places include many electronic devices resulting in an electronically noisy environment that may interfere with communications, such as microwave ovens, garage door openers, radios, television sets, computer systems, etc. The communication medium between wireless devices may change constantly. Most environments include multiple reflective surfaces and corners, creating multipath noise. Also, movement of items or devices or the like, such as hands, bodies, jewelry, mouse pointers, etc. or activation of electronic devices, such as cooling fans or the like, affects the overall wireless communication path and potentially degrades wireless communication performance.

The Institute of Electrical and Electronics Engineers, Inc. (IEEE) 802.11 standard is a family of standards for wireless local area networks (WLAN) in the unlicensed 2.4 and 5 Gigahertz (GHz) bands. A radio configured in accordance with IEEE 802.11a or 802.11g standards employs Orthogonal Frequency Division Multiplexing (OFDM) modulation in which a stream of data is transmitted over multiple small frequency sub-channels. In the OFDM configuration, multiple sub-carrier signals are incorporated within each OFDM symbol. Data is incorporated on each data tone using a selected modulation scheme, such as Binary Phase Shift Keying (BPSK), Quadrature PSK (QPSK), 16 Quadrature Amplitude Modulation (QAM), and/or 64 QAM. Each of the modulation schemes employs a corresponding constellation map with variable constellation points corresponding to a corresponding variable number of bits for achieving the various data rates. For example, BPSK is used for 6 or 9 Mbps, QPSK is used for 12 or 18 Mbps, 16 QAM is used for 24 or 36 Mbps, and 64 QAM is used for 48 or 54 Mbps. The encoding process employs a quadrature generation technique and provides in phase (I) and quadrature (Q) signals on respective I and Q channels.

Commonly, a short training period is included at the start of each transmission, including Short Syncs and two Long Syncs (LS) appended at the front end of each transmitted frame. The Long Syncs provide a reference amplitude and phase for each of the active sub-channels. The Long Syncs may be averaged together to reduce the noise in the received reference values. After the Long Syncs have been received, each sub-channel received symbol is multiplied by the inverse of the reference amplitude and the conjugate of the reference phase (when expressed as a complex unit vector) for that sub-channel. This removes most of the amplitude and phase distortion that has occurred between the transmitter and the receiver.

Optimum soft-decisions should be Signal-to-Noise Ratio (SNR) weighted. The Long Syncs have been used to generate LLR (log likelihood ratio) weights to correctly weight soft-decisions going into an error-correcting decoder, such as a Viterbi decoder or the like. Given a flat noise floor, the use of LLR weights translates into a signal-power weighting. These LLR weights have been the signal power determined in each sub-channel of the Long Syncs. Using the LLR weights improves soft-decisions and reduces transmission errors.

A first problem is that the received reference values are usually degraded by noise, which is an unavoidable consequence of radio transmission. The reference information provided during the training phase (e.g., in the Long Syncs) is known by the receiver, so that a significant amount of this noise can be determined. A second problem, however, is that the signal amplitude and phase distortion may change over time, from the start of transmission of each frame to the end of the frame, making the initial channel estimate information obsolete and inaccurate towards the end of each frame. Both of these problems increase the probability of error when receiving a frame, due to both signal equalization errors and soft-decision weighting errors.

Legacy radios were designed with several assumptions. The channel was assumed to be relatively stable. The frames were bursty in nature and relatively short, so that it was assumed that the wireless channel did not significantly change over the duration of each frame. The initial channel estimate information determined at the start of each frame was assumed to be sufficiently accurate for that frame. Presently, however, there is a greater emphasis on mobility and/or accuracy. Mobility results in a changing environment that could result in significant changes in the channel during each frame. Even in a stable environment, improved accuracy can improve transmission speed and enable a higher transmission rate with a lower packet error rate (PER). It is desired to improve channel estimation to enable mobile application and/or higher transmission rates.

BRIEF DESCRIPTION OF THE DRAWINGS

The benefits, features, and advantages of the present invention will become better understood with regard to the following description, and accompanying drawings in which.

DETAILED DESCRIPTION THE INVENTION

The following description is presented to enable one of ordinary skill in the art to make and use the present invention as provided within the context of a particular application and its requirements. Various modifications to the preferred embodiment will, however, be apparent to one of ordinary skill in the art, and the general principles defined herein may be applied to other embodiments. Therefore, the present invention is not intended to be limited to the particular embodiments shown and described herein, but is to be accorded the widest scope consistent with the principles and novel features herein disclosed.

A system and method of adaptively updating equalizer values while a transmission is being received according to embodiments of the present invention provides improved channel estimation without modifications to the signal format. Accurate reference values are obtained and updated throughout the duration of each transmission. The noise level in the reference values is also reduced. The improved reference values reduce the number of errors in the received transmission. Existing circuits employed during the initial Long Sync calculations are further used to update the reference values, thereby reducing additional hardware.

The LMS weight factors are also adaptively updated and employed in the soft-decision process throughout the duration of each transmitted frame. Adaptive soft-decision weighting is particular advantageous when signal distortion varies during each transmission, which is common in real-world environments and situations. Mobile wireless communications, for example, are significantly improved.

Figure 1:
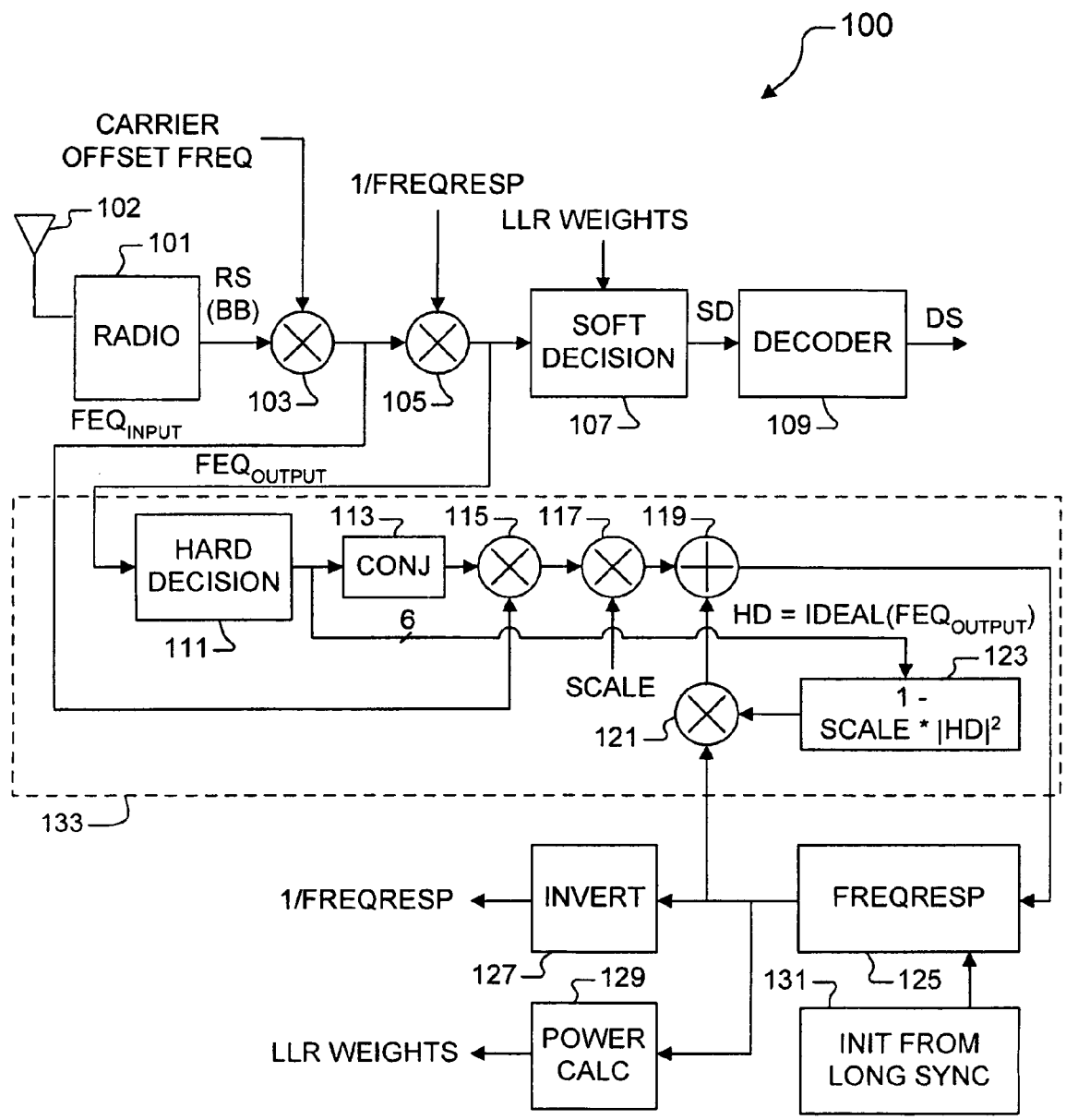
FIG. 1 is a block diagram of an exemplary adaptive frequency equalizer configured in accordance with an embodiment of the present invention.

FIG. 1 is a block diagram of an exemplary adaptive frequency equalizer 100 configured in accordance with an embodiment of the present invention. A radio frequency (RF) signal incorporating a transmitted frame is received by way of antenna 102 and is processed through a radio 101, which converts the RF frame signal into a received baseband signal RS. The received OFDM signal is provided to one input of a multiplier 103, which receives a carrier offset frequency at its other input. The multiplier 103 removes any residual nominal carrier offset frequency in the RS signal. Although only one multiplier is shown, the carrier offset frequency is a phase rotation that is applied equally across a vector of all sub-channels. The output of the multiplier 103 is a preequalization signal vector $FEQ_{INPUT}$, which is provided to an input of an equalizer 105 having multiple taps programmed by a vector of sub-channel reference values (1/FREQRESP). The equalizer 105 is a frequency domain equalizer (FEQ) as known to those of ordinary skill in the art with programmable complex taps. The taps are programmed with real or complex tap coefficients. The equalizer 105 is shown as a multiplier symbol, which represents multiple complex multiplier taps, one for each subchannel of the OFDM symbol. Initially, the 1/FREQRESP reference values are derived from the Long Sync training periods. As described further below, the 1/FREQRESP reference values are further adapted or otherwise updated throughout the duration of the received frame. The output of the equalizer 105 is a post-equalization signal vector $FEQ_{OUTPUT}$, which incorporates received sub-channel symbols that should be near replicas of the transmitted symbols after equalization.

The $FEQ_{OUTPUT}$ signal vector is then demodulated using standard techniques. As shown, for example, the $FEQ_{OUTPUT}$ signal vector is provided to a soft decision block 107, which generates soft decision information (SD) provided to a decoder 109, such as a Viterbi decoder or the like. The decoder 109 outputs a data signal (DS) comprising the transmitted information. The soft decision block 107 employs LLR weights to determine the SD information, where the LLR weights are initially derived from the Long Sync training periods. As described below, the LLR weights are further adapted or otherwise updated throughout the duration of the received frame.

Figure 2:
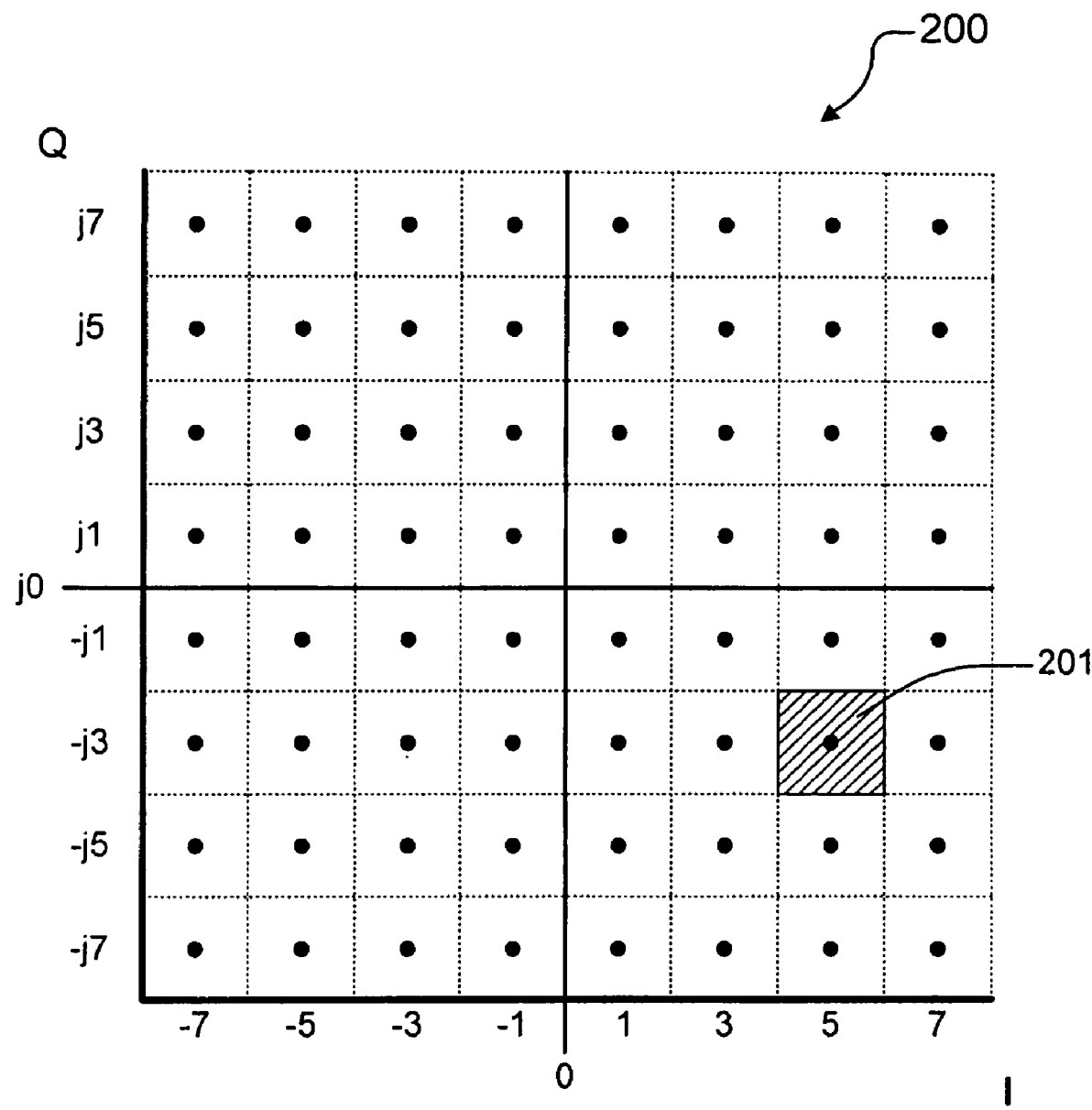
FIG. 2 is a graph diagram of a constellation map according to 64 QAM.

The functions used to adaptively update the 1/FREQRESP reference values are shown just under the main signal path. The two input signal vectors, including the pre-equalization signal vector $FEQ_{INPUT}$ and the post-equalization signal vector $FEQ_{OUTPUT}$ are used for adaptation. The $FEQ_{OUTPUT}$ signal vector is provided to a hard decision (HD) block 111, which outputs ideal HD values for each subchannel of each OFDM symbol. The ideal HD values are also referred to as the $IDEAL(FEQ_{OUTPUT})$ values. The HD block 111 determines the nearest ideal symbol value represented by the $FEQ_{OUTPUT}$ signal vector, which is a complex number, and outputs corresponding ideal symbol values. In the embodiment shown, the HD values are each 6 bits for 65 QAM including a 3-bit real value and a 3-bit imaginary value. FIG. 2 is a graph diagram of a constellation map 200 according to 64 QAM. Since each constellation point has a real or imaginary value of 1, 3, 5 or 7 (4 values total), only three signed bits are needed for the real and imaginary values. Any binary numeric representation scheme may be employed (e.g., 2's complement) as known to those of ordinary skill in the art. In one embodiment, the HD block 111 makes the hard decision determinations by determining which constellation point sub-sector in which each $FEQ_{OUTPUT}$ signal vector value falls. For example, a $FEQ_{OUTPUT}$ signal vector value falling within a sub-sector 201 of the constellation map 200 is assigned the ideal complex value 5-j3 as being the closest constellation point. The HD values are provided to a conjugate block 113, which outputs the conjugate of each HD value to one input of a multiplier 115, having another input receiving the $FEQ_{INPUT}$ signal vector. The multiplier 115 combines the HD value conjugate with the $FEQ_{INPUT}$ signal vector and provides the result to an input of another multiplier 117, which receives a SCALE value at its other input. The multiplier 117 multiplies the output of multiplier 115 with the SCALE value and provides the result to one input of an adder 119, which receives the output of another multiplier 121 at its input. The adder 119 adds the outputs of the multipliers 117 and 121 together and provides FREQRESP adjust values to the input of a FREQ-RESP block 125. Each FREQRESP adjust value is added to a corresponding FREQRESP reference value stored in the FREQRESP block 125 to generate a new and updated FREQ-RESP reference value. In this manner, an accumulative process is used to adaptively update the FREQRESP reference values throughout the duration of each frame.

The FREQRESP reference values from the FREQRESP block 125 are provided to one input of a multiplier 121, which receives corresponding values from a block 123. The HD values from HD block 111 are provided to the input of block 123, which calculates a value $(1-IDEAL(FEQ_{OUTPUT})$ $*CONJ(IDEAL(FEQ_{OUTPUT}))*SCALE)$, or $1-SCALE*|HD|^2$ for each HD input (where CONJ is the conjugate operation), and where each output is a real value. An output of block 123 is provided to the other input of multiplier 121, which multiplies together corresponding values from blocks 123 and 125 and provides the result to the other input of the adder 119. In the embodiment shown, SCALE is a real value (not complex) that controls how fast the target FREQ-RESP responds to changes in a value $FREQRESP_{ESTIMATE}$. SCALE may be a static value or it may be varied over time to optimize performance. SCALE is typically between 1 and 0, and can be a negative power of 2 (e.g., $\frac{1}{32}$, $\frac{1}{64}$, etc.), which simplifies the multiplication into a bit shift. In one embodiment, the multiplier 117 is a shift register that reduces the digital output of multiplier 115 by shifting one or more times.

Since the ideal HD values are known, once SCALE is selected, the full set of values stored in block 123 may be determined. For 64 QAM, block 123 stores 64 values, each corresponding to a constellation point shown in the constellation map 200. 16 QAM uses the inner 4×4 matrix, and QPSK uses the inner 2×2 matrix. BPSK uses +/−1+j0 only. Pilot tones may be treated as BPSK or as 1+j0 if scrambling has been removed. The block 123 may be implemented in hardware as a lookup table (LUT) in which each HD value from HD block 111 operates as an address to access the corresponding value output from the lookup table. If SCALE is predetermined and static, the lookup table may be hard-wired or otherwise stored with permanent values. If SCALE is programmable or otherwise varied during operation, then the lookup table may be programmed once SCALE is determined. Once the values for 64 QAM are determined and stored, the 16 QAM and QPSK values are also determined as subsets, and BPSK is only two values +1 or −1. Thus, the particular data rate does not have to be known before-hand.

A block 131 represents the logic and/or circuitry used to generate initial FREQRESP reference values determined from the Long Sync training periods of the frame. The initial FREQRESP reference values are stored into the FREQRESP block 125, and inverted by an inverter block (INVERT) 127 to generate initial 1/FREQRESP reference values used to initially program the equalizer 105. As each subsequent OFDM symbol is processed, the FREQRESP reference values stored in the FREQRESP block 125 are adaptively updated by the values output from the adder 119. The updated FREQRESP reference values are inverted by inverter block 127 providing updated 1/FREQRESP reference values, which are used to update the equalizer 105. In this manner, the initial channel estimate programmed into the equalizer 105 as determined by the Long Sync training periods is continuously updated throughout the duration of each frame. In this manner, the channel estimate becomes more accurate for a relatively stable channel or adapts to changes in the channel.

A dashed line 133 identifies the additional hardware to perform the adaptive process. The inversion process is already used in legacy systems to convert the Long Syncs into the 1/FREQRESP equalizer values, so that the hardware used to implement the inverter 119 is reused. Similar hardware previously used to store the initial 1/FREQRESP reference values is used to implement the FREQRESP block 125 to store the initial and adaptively updated FREQRESP reference values. The filtering process performed by the adaptive frequency equalizer 100 occurs before inversion, which provides improved noise reduction. The FREQRESP reference values tend to be significantly smaller values than the 1/FREQRESP reference values, where the averaging of larger numbers tends to increase noise and decrease accuracy. Therefore, the use of FREQRESP values results in maximum performance.

The updated FREQRESP reference values from the FREQRESP block 125 are provided to a power calculation block 129, which generates the LLR weights used by the soft decision block 107. In legacy systems, the LLR weights calculated from the Long Syncs were used throughout the remaining portion of the frame. Since the FREQRESP reference values are adaptively updated, the LLR weights are also adaptively updated to improve the soft decision process. LLR weight adaptation is beneficial in real-world situations in which signal distortion varies during any particular transmission.

The adaptation process calculates new FREQRESP reference value estimates by estimating what the values should have been to convert the $FEQ_{INPUT}$ value into an ideal $FEQ_{OUTPUT}$ value as illustrated by the following equation 1:

$$1/\text{FREQRESP}_{ESTIMATE} = \text{IDEAL}(FEQ_{OUTPUT})/FEQ_{INPUT} \quad (1)$$

where $\text{IDEAL}(FEQ_{OUTPUT})$ signifies the ideal symbol value nearest to $FEQ_{OUTPUT}$, and all values are complex. Equation 1 simplifies to following equation 2:

$$\text{FREQRESP}_{ESTIMATE} = FEQ_{INPUT}/\text{IDEAL}(FEQ_{OUTPUT}) \quad (2)$$

Then the $\text{FREQRESP}_{ESTIMATE}$ is filtered into the current FREQRESP reference values using a filter coefficient that is weighted by the ideal $FEQ_{OUTPUT}$ power. The weighting places more emphasis on estimates calculated from higher-powered symbols, which provides better accuracy than unweighted estimates. The weighted filtering is described according to the following equation 3:

$$\text{FREQRESP} = \text{FREQRESP} + (\text{FREQRESP}_{OUTPUT} - \text{FREQRESP})*\text{SCALE}*(\text{IDEAL}(FEQ_{OUTPUT})*\text{CONJG}(\text{IDEAL}(FEQ_{OUTPUT}))) \quad (3)$$

using SCALE as previously described. SCALE may be varied over time to optimize performance.

Equation 3 can be simplified for hardware by substituting for $\text{FREQRESP}_{ESTIMATE}$ and recognizing that the inverse of a complex number "c" is $1/c = \text{CONJ}(c)/(c*\text{CONJ}(c))$. First, substitute as illustrated by the following equation 4:

$$\text{FREQRESP} = \text{FREQRESP} + (FEQ_{OUTPUT}/\text{IDEAL}(FEQ_{OUTPUT}) - \text{FREQRESP}*\text{SCALE}*(\text{IDEAL}(FEQ_{OUTPUT})*\text{CONJ}(\text{IDEAL}(FEQ_{OUTPUT}))) \quad (4)$$

Then substitute for $1/\text{IDEAL}(FEQ_{OUTPUT})$ as shown by the following equation 5:

$$\text{FREQRESP} = \text{FREQRESP} + (FEQ_{INPUT}*\text{CONJ}(\text{IDEAL}(FEQ_{OUTPUT}))/(\text{IDEAL}(FEQ_{OUTPUT})*\text{CONJ}(\text{IDEAL}(FEQ_{OUTPUT}))) - \text{FREQRESP}*\text{SCALE}*(\text{Ideal}(FEQ_{OUTPUT})*\text{CONJ}(\text{IDEAL}(FEQ_{OUTPUT}))) \quad (5)$$

Finally, simplify as illustrated by the following equation 6:

$$\text{FREQRESP} = \text{FREQRESP} + (FEQ_{INPUT}*\text{CONJ}(\text{IDEAL}(FEQ_{OUTPUT})))*\text{SCALE} - \text{FREQRESP}*\text{IDEAL}(FEQ_{OUTPUT})*\text{CONJ}(\text{IDEAL}(FEQ_{OUTPUT}))*\text{SCALE} \quad (6)$$

And as illustrated by the following equation (7):

$$\text{FEQRESP} = \text{FREQRESP}*(1-\text{IDEAL}(FEQ_{OUTPUT})*\text{CONJ}(\text{IDEAL}(FEQ_{OUTPUT}))*\text{SCALE}) + (FEQ_{INPUT}*\text{CONJ}(\text{IDEAL}(FEQ_{OUTPUT})))*\text{SCALE} \quad (7)$$

It is appreciated that division has been eliminated. Also, the component "$1-(\text{IDEAL}(FEQ_{OUTPUT})*\text{CONJ}(\text{IDEAL}(FEQ_{OUTPUT})))$" has relatively few values, since IDEAL $(FEQ_{OUTPUT})$ takes on only the few ideal symbol values. This makes it amenable to implementation as a lookup table as previously described, which reduces hardware implementation complexity.

An advantage of the present invention is that additional signal information, other than the Long Sync training periods, is used to update the 1/FREQRESP equalizer values. This results in more accurate values, and fewer transmission errors. If the signal distortion is changing, the continuously updated equalizer values can track the signal changes, providing appropriate and up-to-date equalizer values throughout the transmission duration. This can reduce transmission errors, particularly when long transmissions are used.

Figure 3:
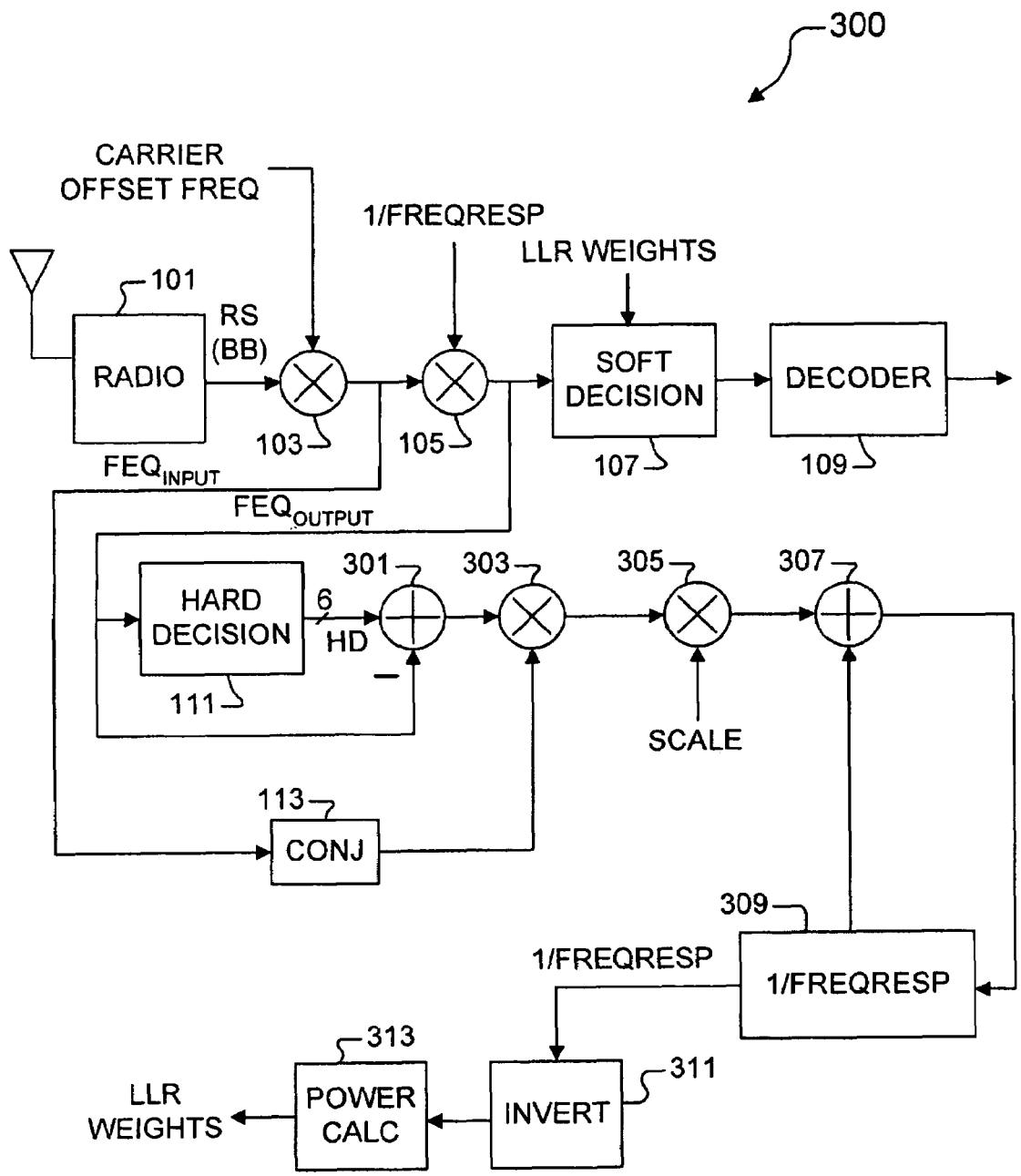
FIG. 3 is a block diagram of an LMS-structured adaptive frequency equalizer.

FIG. 3 is a block diagram of a Least Means Squared (LMS)—structured adaptive frequency equalizer 300. The primary signal path from the radio 101 to the decoder 109 is substantially the same, where the same reference numbers are used for similar components. $FEQ_{OUTPUT}$ is provided to the HD block 111 as before, which outputs the HD values. In this case, the $FEQ_{OUTPUT}$ is subtracted from the HD values by an adder 301, and the result is multiplied by the conjugate of $FEQ_{OUTPUT}$ by a multiplier 303. $FEQ_{OUTPUT}$ is provided to a conjugate block 304, which provides $CONJ(FEQ_{INPUT})$ to the multiplier 303. The output of multiplier 303 is multiplied by SCALE at a multiplier 305, and the result is added to current 1/FREQRESP values stored in a 1/FREQRESP block 309. The updated result is stored back in the /FREQRESP block 309 to adaptively update the 1/FREQRESP reference values. The 1/FREQRESP reference values are provided to an inverter 311, which provides corresponding FREQRESP values to a power calculation block 313 to generate the LLR weights used in the soft decision operation. Since the 1/FREQRESP reference values are adaptively updated, the LLR weights may also be adaptively updated to improve transmission.

The adaptive frequency equalizer 100 has at least two performance advantages over the LMS-structured adaptive frequency equalizer 300. The filtering of the LMS adaptive frequency equalizer 300 may be expressed according to the following equation 8:

$$1/FREQRESP = (1/FREQRESP)*(1-FEQ_{INPUT}*CONJ(FEQ_{INPUT})*SCALE) + (IDEAL(FEQ_{OUTPUT})*CONJ(FEQ_{INPUT})*SCALE \quad (8)$$

whereas the filtering of the equalizer 100 is expressed in equation 7, repeated as follows:

$$FREQRESP = FREQRESP*(1-IDEAL(FEQ_{OUTPUT})*CONJ(IDEAL(FEQ_{OUTPUT}))*SCALE + (FEQ_{INPUT}*CONJ(IDEAL(FEQ_{OUTPUT}))*SCALE \quad (7)$$

A major difference has been highlighted in bold type. LMS filtering is weighted by noisy $FEQ_{INPUT}$ powers. The filtering employed by the adaptive frequency equalizer 100 is weighted by the noise-free $IDEAL(FEQ_{OUTPUT})$ powers. This difference results in lower noise in the reference estimates when compared to LMS estimates, and translates into reduced transmission errors.

Second, the LMS structure can be seen to be averaging values of $IDEAL(FEQ_{OUTPUT})/FEQ_{INPUT}$. At small values of $FEQ_{INPUT}$, due to added noise, the value of this ratio may vary widely, with large numbers that may dominate when averaged with near-normal values. There is also the possibility of a divide-by-zero problem. The adaptive frequency equalizer 100 averages values of $FEQ_{INPUT}/IDEAL(FEQ_{OUTPUT})$. If noise brings $FEQ_{INPUT}$ close to zero value, the value of this ratio will be close to zero. Its importance diminishes when averaged with near-normal values. The resulting average then inverts nicely into a value with less noise than the LMS method, which correspondingly reduces transmission errors.

Figure 4:
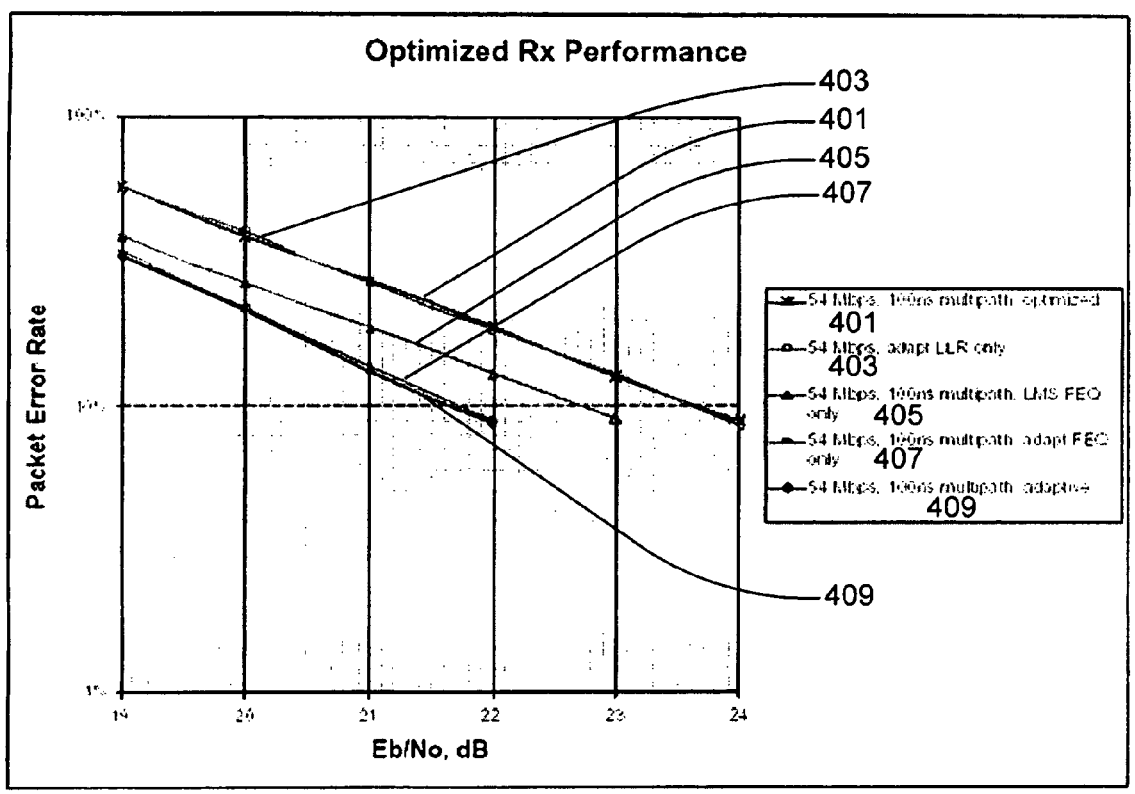
FIG. 4 is a chart of simulated PER performance comparing a legacy equalizer with an adaptive frequency equalizer using adaptive LLR weighting according to embodiments of the present invention.

FIG. 4 is a chart of simulated Packet Error Rate (PER) performance comparing legacy equalizer and LLR weighting configurations with adaptive equalizer and adaptive LLR weighting according to embodiments of the present invention. The chart shows simulation results comparing non-adaptive equalization according to prior art, adaptive equalization using the adaptive frequency equalizer 100 both with and without LLR weight adaptation, and the LMS adaptive frequency equalizer 300. All plots are at a data rate of 54 megabits per second (Mbps). A first plot 401 with star-shaped points illustrates the non-adaptive legacy approach. The second plot 403 with open square points illustrates the legacy case with the addition of adaptive LLR weights. The third plot 405 with triangle points illustrates the LMS adaptive equalizer approach without LLR weight adaptation. The fourth plot 407 with closed square points illustrates the approach employed by the adaptive frequency equalizer 100 without LLR weight adaptation. The fifth plot 409 with diamond points illustrates the approach employed by the adaptive frequency equalizer 100 using LLR weight adaptation.

For the same 10% PER, the prior art implementation required an energy per bit (Eb) over one-sided Noise spectral density (No) ratio (Eb/No) of about 23.6 decibels (dB). The adaptive frequency equalizer 100 required an Eb/No of only 21.7 dB as shown by plot 409 (including LLR weight adaptation), which provides an improvement in performance of 1.9 dB. The LMS adaptive frequency equalizer 300 required an Eb/No of 22.7 dB as shown by plot 405, just about splitting the difference between the other two implementations. Two additional simulations were performed, including plot 403 in which only the LLR weights used in the soft-decisions ("adapt LLR only") were updated, which showed no improvement in this particular simulation. The other plot 407 in which only the equalizer values ("adapt FEQ only") were updated using the adaptive frequency equalizer 100 without LLR weight adaptation, which achieved nearly all of the improvement of the full implementation (FEQ and LLR adaptation). The simulations appear to show that performance is not too sensitive to the LLR soft-decision weightings. The illustrated simulations, however, did not vary the signal distortion during a single transmission. Such signal distortion variations, which occurs in real-world environments, places more importance on the soft-decision weights. In this manner, the LLR adaptation improves performance.

Although a system and method according to the present invention has been described in connection with various embodiments, it is not intended to be limited to the specific form set forth herein, but on the contrary, it is intended to cover such alternatives, modifications, and equivalents, as can be reasonably included within the spirit and scope of the invention.

The invention claimed is:

1. An adaptive frequency equalization system, comprising:
   an equalizer with programmable taps configured to adjust magnitude and phase of symbol information of a received signal and to provide equalized symbol information;
   a hard decision circuit configured to select ideal symbol values using said equalized symbol information;
   a frequency response circuit configured to determine frequency response update values using said ideal symbol values and said received signal; and
   an adjust circuit configured to update stored frequency response information using said frequency response update values during a transmitted frame, and to update said programmable taps of said equalizer using said stored frequency response information.

2. The adaptive frequency equalization system of claim 1, wherein said adjust circuit comprises an inverter that inverts said stored frequency response information to provide tap coefficient values for said equalizer.

3. The adaptive frequency equalization system of claim 1, further comprising:
   a soft-decision circuit that determines soft decision symbols using said equalized symbol information and log likelihood ratio (LLR) weight factors; and
   a power calculation circuit that generates said LLR weight factors from said stored frequency response information.

4. The adaptive frequency equalization system of claim 1, wherein said frequency response circuit comprises:

a memory storing a set of update factors for each ideal symbol value, where each update factor is calculated by taking the absolute value of the square of the corresponding ideal symbol value, multiplying by a scale factor, and subtracting the result from one;

a first multiplier multiplying said stored frequency response information by a corresponding update factor from said memory;

a conjugate block for conjugating ideal symbol values from said hard decision circuit and that provides conjugated values;

a second multiplier multiplying symbol information from said received signal with a corresponding conjugated values from said conjugate block to provide corresponding frequency response estimate values;

a third multiplier multiplying each frequency response estimate value by said scale factor; and an adder adding corresponding outputs from said first and third multipliers to determine said frequency response update values.

5. The adaptive frequency equalization system of claim 4, wherein said memory comprises a lookup table.

6. The adaptive frequency equalization system of claim 1, wherein said frequency response circuit determines said frequency response update values based on a least means squared (LMS) method, and wherein said adjust circuit stores inverted frequency response values used as coefficient values for said programmable taps of said equalizer.

7. An adaptive frequency equalization system, comprising:
an equalizer with programmable taps configured to adjust magnitude and phase of symbol information of a received signal and to provide equalized symbol information;

a hard decision circuit configured to select ideal symbol values using said equalized symbol information;

a frequency response circuit configured to determine frequency response update values using said ideal symbol values and said received signal;

an adjust circuit configured to update stored frequency response information using said frequency response update values during a transmitted frame, and to update said programmable taps of said equalizer using said stored frequency response information; and a soft-decision circuit that determines soft decision symbols using said equalized symbol information and log likelihood ratio (LLR) weight factors, the soft-decision circuit being responsive to the frequency response update values; and a power calculation circuit that generates said LLR weight factors from said stored frequency response information.

8. The adaptive frequency equalization system of claim 7, wherein said adjust circuit comprises an inverter that inverts said stored frequency response information to provide tap coefficient values for said equalizer.

9. The adaptive frequency equalization system of claim 7, wherein said frequency response circuit comprises:
a memory that stores a set of update factors for each ideal symbol value, where each update factor is calculated by taking the absolute value of the square of the corresponding ideal symbol value, multiplying by a scale factor, and subtracting the result from one.

10. The adaptive frequency equalization system of claim 9, further comprising a first multiplier multiplying said stored frequency response information by a corresponding update factor from said memory.

11. The adaptive frequency equalization system of claim 10, further comprising a conjugate block for conjugating ideal symbol values from said hard decision circuit and that provides conjugated values.

12. The adaptive frequency equalization system of claim 11, further comprising a second multiplier multiplying symbol information from said received signal with a corresponding conjugated values from said conjugate block to provide corresponding frequency response estimate values.

13. The adaptive frequency equalization system of claim 9, further comprising a third multiplier multiplying each frequency response estimate value by said scale factor.

14. The adaptive frequency equalization system of claim 9, further comprising an adder adding corresponding outputs from said first and third multipliers to determine said frequency response update values.

15. An adaptive frequency equalization system, comprising:
means for adjusting magnitude and phase of symbol information of a received signal and providing equalized symbol information;

means for selecting ideal symbol values using said equalized symbol information;

means for determining frequency response update values using said ideal symbol values and said received signal;

means for updating stored frequency response information using said frequency response update values during a transmitted frame;

means for updating said programmable taps of said equalizer using said stored frequency response information;

means for determining soft decision symbols using said equalized symbol information;

means for logging likelihood ratio (LLR) weight factors; and means for generating said LLR weight factors from said stored frequency response information.

16. The adaptive frequency equalization system of claim 15, further comprising means for inverting said stored frequency response information to provide tap coefficient values for said equalizer.

17. The adaptive frequency equalization system of claim 15, further comprising:
means for storing a set of update factors for each ideal symbol value, where each update factor is calculated by taking the absolute value of the square of the corresponding ideal symbol value, multiplying by a scale factor, and subtracting the result from one;

first means for multiplying said stored frequency response information by a corresponding update factor from said memory; and means for conjugating ideal symbol values from said hard decision circuit and that provides conjugated values.

18. The adaptive frequency equalization system of claim 17, further comprising:
second means for multiplying symbol information from said received signal with a corresponding conjugated values from said conjugate block to provide corresponding frequency response estimate values;

third means for multiplying each frequency response estimate value by said scale factor; and means for adding corresponding outputs from said first means for multiplying and third means for multiplying to determine said frequency response update values.

19. The adaptive frequency equalization system of claim 18, wherein said means for storing comprises a lookup table.

20. The adaptive frequency equalization system of claim 15, further comprising means for determining said frequency response update values based on a least means squared (LMS) method; and means for storing inverted frequency response values used as coefficient values for said programmable taps of said equalizer.

* * * * *